April 14, 1925.  1,533,611
W. R. RESPESS
ELECTRICAL CONDENSER AND METHOD OF MANUFACTURING THE SAME
Filed Dec. 22, 1923    2 Sheets-Sheet 1

FILM OF DIELECTRIC
PAINTED ON CONDUCTIVE
SHEETS.

WILLIAM R. RESPESS, INVENTOR.

BY John B. Brady
ATTORNEY

April 14, 1925.  1,533,611
W. R. RESPESS
ELECTRICAL CONDENSER AND METHOD OF MANUFACTURING THE SAME
Filed Dec. 22, 1923    2 Sheets-Sheet 2
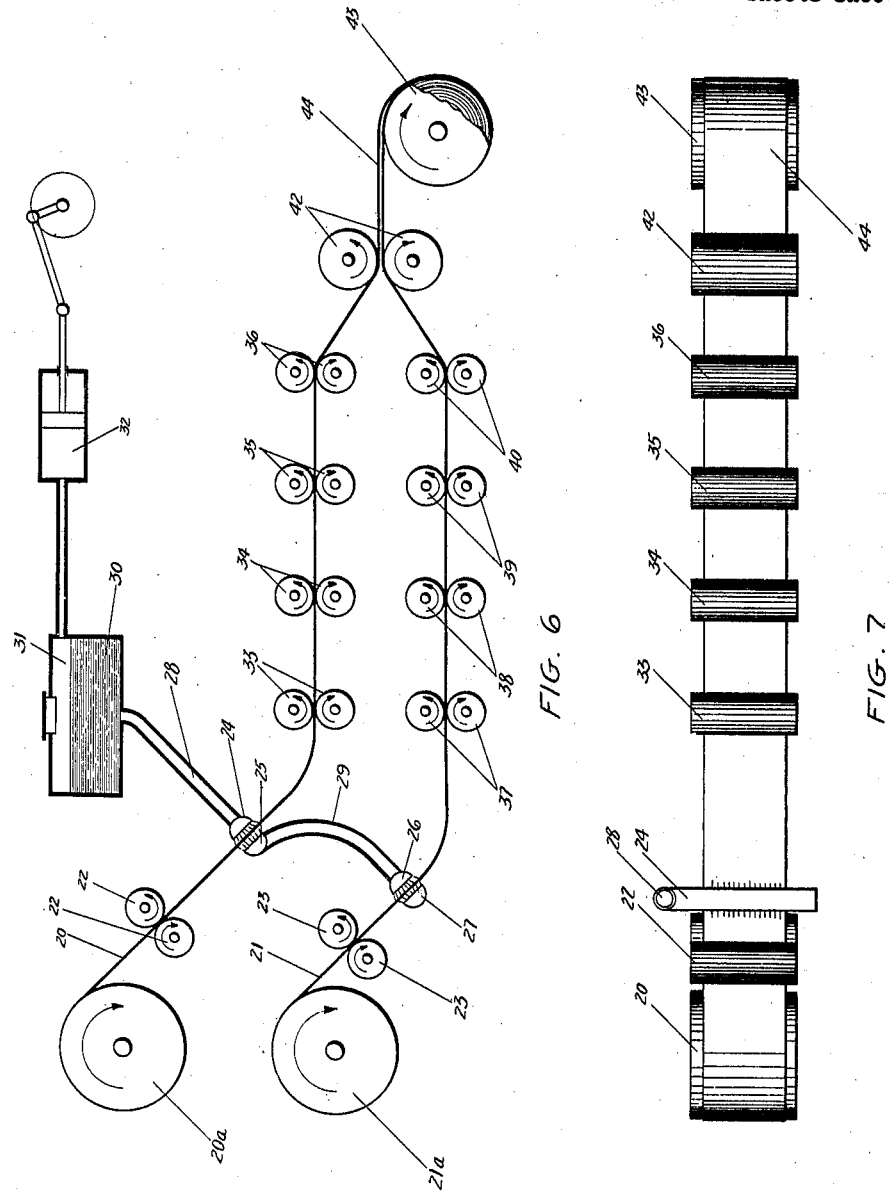
WILLIAM R. RESPESS INVENTOR.
BY John B Brady
ATTORNEY Patented Apr. 14, 1925.

1,533,611

UNITED STATES PATENT OFFICE.

WILLIAM R. RESPESS, OF ST. GEORGE, NEW YORK, ASSIGNOR TO NEW JERSEY RESEARCH COMPANY, A CORPORATION OF NEW JERSEY.

ELECTRICAL CONDENSER AND METHOD OF MANUFACTURING THE SAME.

Application filed December 22, 1923. Serial No. 682,238.

*To all whom it may concern:*

Be it known that I, WILLIAM R. RESPESS, a citizen of the United States, residing at St. George, Staten Island, in the county of Richmond and State of New York, have invented a certain new and useful Improvement in Electrical Condensers and Methods of Manufacturing the Same, of which the following is a specification.

My invention relates broadly to electrical condensers, and more particularly to a construction of and the method of manufacturing a condenser having improved dielectric properties.

One of the objects of my invention is to provide a condenser in which the metallic armatures are coated with a dielectric film directly on the surface of the armatures.

Another object of my invention is to establish a method of manufacturing condensers in which metallic foils are coated with a solution of rubber which is worked for the removal of air bubbles and then dried upon the foil providing a dielectric film immediately upon the surface of the foil.

A still further object of my invention is to provide a dielectric of such properties that it may be readily sprayed upon a metallic armature and thereby form an insulating film over the surface thereof in such manner that armatures coated with the dielectric films may be placed immediately adjacent each other forming a condenser.

Figure 1:
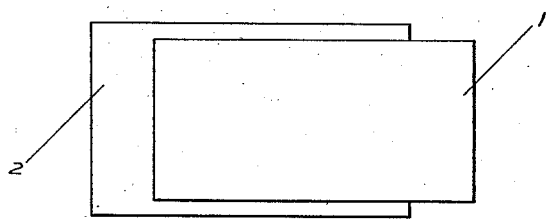
Figure 2:
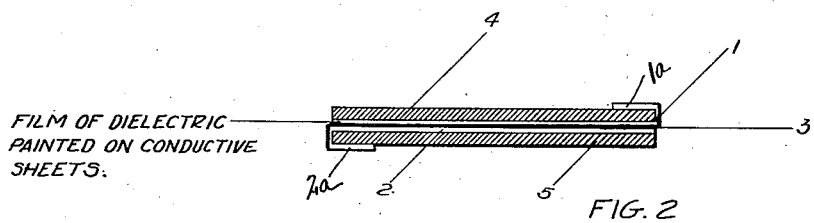
Figure 3:
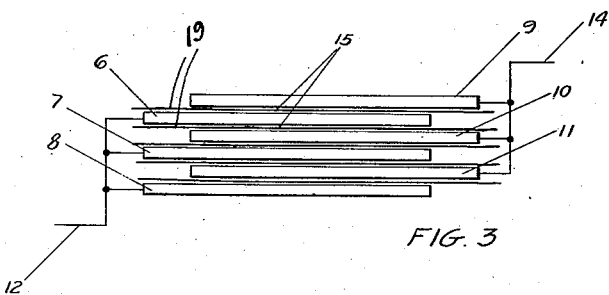
Figure 4:
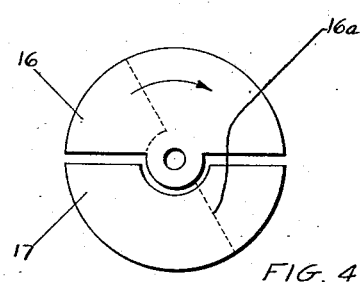
Figure 5:
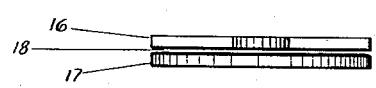

Other and further objects of my invention will be understood from the specification hereinafter following by reference to the accompanying drawings forming a part thereof, in which:

Figure 1 is a diagrammatic plan view of a pair of condenser armatures each of which is coated with a dielectric film according to my present invention and placed immediately adjacent each other; Fig. 2 is a cross sectional view showing a pair of conductive condenser sheets which have been subjected to a dielectric film coating and stacked immediately adjacent each other; Fig. 3 is an elementary diagram showing a condenser stack in which insulating sheets which have been subjected to a dielectric film coating are interposed between plates of opposite potential; Figs. 4 and 5 illustrate in elemental form a variable condenser, the armatures of which have been subjected to the dielectric coating to be hereinafter described; and Figs. 6 and 7 are views illustrating the series of steps which I employ in the manufacture of a condenser according to the present invention.

Heretofore in the art it has been customary to construct condensers with a number of alternate metallic armatures and dielectric sheets therebetween in the form of a stack, or the opposite plates have been spaced from each other by air dielectric or oil. These various arrangements have been inherently expensive in manufacture. Condensers built up in stacks with alternate metallic and dielectric sheets require an undesirably large number of individual parts, increasing both the difficulty and expense of the production processes.

By my present invention I provide a solution of rubber with which I treat the metallic armatures which are to be used in the manufacture of condensers. The rubber solution which I have developed includes water and rubber as its principal constituents and has such properties that it may be sprayed upon the metallic foil sheet under pressure and all air bubbles gradually excluded from the coating and the coating gradually dried upon the foil. A plurality of metallic foils may be simultaneously subjected to this process and then the foils brought into contact forming alternate plates of a condenser. The rubberized film which is dried upon each of the plates forms the dielectric between the plates. Rubber solution is placed on the armatures by either dipping the armatures therein, painting the solution thereupon, or spraying the solution under pressure upon the armatures. When several armatures have been built up in a strip of extended length by my improved process they may be cut off at predetermined intervals to form a condenser stack of a predetermined capacity.

Referring more particularly to the drawings, Figs. 1 and 2 illustrate diagrammatically the manner of building up a condenser stack with metallic armatures 1 and 2, each of which has been subjected to a rubber film coating 3 forming a dielectric. In Fig. 2 I show a condenser stack formed by the condenser armatures 1 and 2 secured together under pressure by insulated end plates 4 and 5. The ends 1ª and 2ª of the condenser armatures 1 and 2 are extended over the sides of end plates 4 and 5 and the dielectric film scraped therefrom in order to provide terminals for the condenser.

In Fig. 3 I show a set of condenser armatures 6, 7, and 8 interposed between a set of opposite armatures 9, 10 and 11. One set of armatures is connected to terminal 12 and the other set to terminal 14. Plates of opposite potential are separated by the thin sheets 15 which have been treated with my rubber solution forming dielectric films of rubber 19 on each side of the sheets. These sheets may be ordinary paper, the dielectric property of which is greatly increased by the film of rubber 19 on each side thereof which is secured by treatment to be hereinafter more fully explained.

Figs. 4 and 5 show the application of my invention to variable condensers having opposite plates 16 and 17. Each of the plates is coated with a film of rubber in such manner that they may be placed directly adjacent or extremely close together, separated only by a minute air space 18, thereby greatly increasing the capacity of the condenser. It will be understood that plate 16 may be rotated with respect to plate 17 in such a position as 16ª.

Referring now more particularly to Figs. 6 and 7, I have shown a pair of reels 20ª and 21ª which carry flexible metallic foil strips 20 and 21. In the arrangement shown, both strips 20 and 21 are treated simultaneously. It will be understood that many strips may be simultaneously treated or only a single strip may be treated at one time. In the drawings as shown, the strips 20 and 21 are each dried and all air bubbles excluded from the surface thereof by means of heated pressure rollers 22 and 23. The strips are then passed under spray nozzles 24—25 and 26—27. These spray nozzles are connected together by conduits 28 and 29 and are supplied with my rubber solution 30 under pressure, as represented in the enclosed tank 31 and air compressor 32 connected therewith. It will be observed that the rubber solution is sprayed simultaneously on both sides of the metallic foils 20 and 21. The rubber coating has now been placed on the foils under pressure and includes a moisture content which must be removed. Strip 20 is passed under a set of rollers illustrated at 33, 34, 35, and 36, which are suitably heated and arranged to remove air bubbles from the surfaces of the films on each side of the foil at the same time that the moisture content is progressively removed from the films. The foil 21 is treated in like manner by its passage through rollers 37, 38, 39, and 40 which operate to both remove the air from the films at the same time that the films are progressively dried on each side of the foils. The foils with their rubber dielectric coatings thereon may now be placed in immediate contact by passage under rollers 42 which deliver the foils in stacked strips, as indicated at 44, in such manner that they may be rolled upon reel 43. The reel 43 may then be removed to a strip feeding and cutting machine and the stack strips 44 fed to a suitable cutting knife and predetermined lengths cut from the strip to enable condensers of predetermined capacity to be built up therefrom.

It will be observed that my process of manufacturing condensers is capable of quantity production at small cost, greatly decreasing the skill heretofore required in condenser manufacture.

The insulating film may be applied to the metallic foil sheets by dipping the sheets in the solution of water and rubber after which the sheets are removed and subjected to heat treatment to drive off the water content. The film of rubber dries upon the foil sheets forming a dielectric surface thereover.

While I have described my invention in certain particular embodiments, it will be understood that modifications may be made and that I intend no limitations upon the invention other than are imposed by the scope of the appended claims.

Having thus described my invention, what I claim and desire to secure by Letters Patent of the United States is as follows:

1. The method of making a condenser which consists in coating metallic armatures with rubber in solution, evaporating the moisture content from said coating on said armatures leaving a rubberized insulated film and building up said armatures one adjacent another to form a condenser.

2. The method of making a condenser which consists in dipping metallic foil sheets in a solution whose chief constituent is rubber, drying said rubber on said sheets and building up said sheets one adjacent another separated by a film of rubber whereby to construct a condenser.

3. The method of making a condenser which consists in dipping metallic foil sheets in a solution containing water and rubber, removing said sheets from said solution, heating said sheets to drive off water content, drying a film of rubber on each of said sheets and building up said sheets with the rubber film of one directly in contact with the rubber film of another whereby a condenser is formed by the conjoint relation of said sheets.

4. An electrical condenser comprising a plurality of flexible metallic foil sheets and a flexible film of rubber on each of said sheets with said rubber film directly in contact substantially insulating one of said sheets from another.

5. The method of manufacturing condensers which consists in coating metallic foil sheets with a rubber solution, removing air bubbles from the coating thus formed, and drying said coating whereby to secure a dielectric directly upon said sheets.

6. The method of manufacturing condensers which consists in drying metallic foil sheets coating said sheets with a rubber solution removing the air bubbles from said coating, drying said coating on said sheets whereby to form condenser armatures with a dielectric immediately upon the surface thereof.

7. The method of manufacturing condensers which consists in subjecting dry sheets of metallic foil to a coating of rubber in solution, removing the air bubbles from said coating, drying the coating on said foil and pressing one foil sheet in contact with another whereby to form a completed condenser with said armatures separated by an insulating film of rubber.

WILLIAM R. RESPESS.